(12) United States Patent
Breure

(10) Patent No.: US 12,310,290 B2
(45) Date of Patent: May 27, 2025

(54) MOVEABLE DEVICE FOR PICKING UP A PRODUCT FROM THE LAND

(71) Applicant: PLOEGER OXBO EUROPE B.V., Roosendaal (NL)

(72) Inventor: Hendrik Willem Breure, Roosendaal (NL)

(73) Assignee: PLOEGER OXBO EUROPE B.V., Roosendaal (NL)

( * ) Notice: Subject to any disclaimer, the term of this patent is extended or adjusted under 35 U.S.C. 154(b) by 758 days.

(21) Appl. No.: 17/595,462

(22) PCT Filed: May 26, 2020

(86) PCT No.: PCT/NL2020/050337
§ 371 (c)(1),
(2) Date: Nov. 17, 2021

(87) PCT Pub. No.: WO2020/242303
PCT Pub. Date: Dec. 3, 2020

(65) Prior Publication Data
US 2022/0201937 A1    Jun. 30, 2022

(30) Foreign Application Priority Data
May 27, 2019   (NL) .................................... 2023209

(51) Int. Cl.
*A01D 78/14*    (2006.01)
(52) U.S. Cl.
CPC .................................. *A01D 78/146* (2013.01)
(58) Field of Classification Search
CPC ..... A01D 78/146; A01D 84/00; A01D 89/008
See application file for complete search history.

(56) References Cited

U.S. PATENT DOCUMENTS

| | | | | |
|---|---|---|---|---|
| 2,862,347 A | * | 12/1958 | Nelson | A01F 15/101 100/142 |
| 4,185,445 A | * | 1/1980 | van der Lely | A01D 43/107 56/192 |
| 5,450,717 A | * | 9/1995 | Delperdang | A01D 84/00 56/366 |
| 7,310,929 B2 | * | 12/2007 | Dow | A01B 73/02 56/192 |

(Continued)

FOREIGN PATENT DOCUMENTS

| | | | | |
|---|---|---|---|---|
| AT | 56363 B | * | 11/1912 | A01F 29/10 |
| DE | 19847891 A1 | * | 4/2000 | A01D 43/085 |

(Continued)

OTHER PUBLICATIONS

International Search Report in International Application No. PCT/NL2020/050337, mailed Aug. 13, 2020 (3 pages).

*Primary Examiner* — Arpad Fabian-Kovacs
(74) *Attorney, Agent, or Firm* — NIXON PEABODY LLP

(57) ABSTRACT

A device is movable in a direction of travel over land. The device is provided with a lifting mechanism for picking up a product from the land, and a transport mechanism which is positioned with respect to the lifting mechanism in such a way that the product picked up from the land by the lifting mechanism can be moved onto the transport mechanism. The product can be conveyed in at least one transport direction and can be deposited on the land via the transport mechanism.

16 Claims, 5 Drawing Sheets

(56) References Cited

U.S. PATENT DOCUMENTS

| | | | | |
|---|---|---|---|---|
| 7,418,811 B2 * | 9/2008 | Hironimus | ............ | A01D 84/00 56/354 |
| 8,091,331 B2 * | 1/2012 | Dow | ............ | A01B 73/02 56/192 |
| 8,166,739 B2 * | 5/2012 | Dow | ............ | A01D 78/002 56/192 |
| 9,038,358 B2 * | 5/2015 | Landon | ............ | A01D 84/00 56/192 |
| 9,386,749 B1 | 7/2016 | Dow | | |
| 9,999,178 B2 * | 6/2018 | Leiston | ............ | A01D 89/003 |
| 10,028,438 B2 * | 7/2018 | Boone | ............ | A01D 89/007 |
| 2001/0054278 A1 * | 12/2001 | Rauch | ............ | A01D 41/16 56/14.9 |
| 2004/0200203 A1 * | 10/2004 | Dow | ............ | A01D 84/00 56/375 |
| 2006/0162308 A1 * | 7/2006 | Dow | ............ | A01D 57/20 56/192 |
| 2007/0119140 A1 * | 5/2007 | Gette | ............ | A01D 89/008 56/364 |
| 2014/0202126 A1 * | 7/2014 | Depestel | ............ | A01D 75/18 56/10.2 J |
| 2015/0128552 A1 * | 5/2015 | Dow | ............ | A01B 73/02 56/377 |

FOREIGN PATENT DOCUMENTS

| | | | | |
|---|---|---|---|---|
| DE | 10120204 A1 * | 1/2003 | ............ | A01D 89/008 |
| DE | 10120124 C2 * | 4/2003 | ............ | A01D 89/008 |
| DE | 102005056554 A1 * | 6/2007 | ............ | A01D 89/008 |
| DE | 102012011591 B4 * | 3/2015 | ............ | A01D 89/008 |
| EP | 1 252 814 A1 | 10/2002 | | |
| EP | 3 326 448 A1 | 5/2018 | | |
| EP | 3 590 323 A1 | 1/2020 | | |
| WO | WO-8706793 A * | 11/1987 | ............ | A01D 84/00 |
| WO | WO 2012/094331 A2 | 7/2012 | | |
| WO | WO-2020046115 A1 * | 3/2020 | ............ | A01D 57/20 |

* cited by examiner

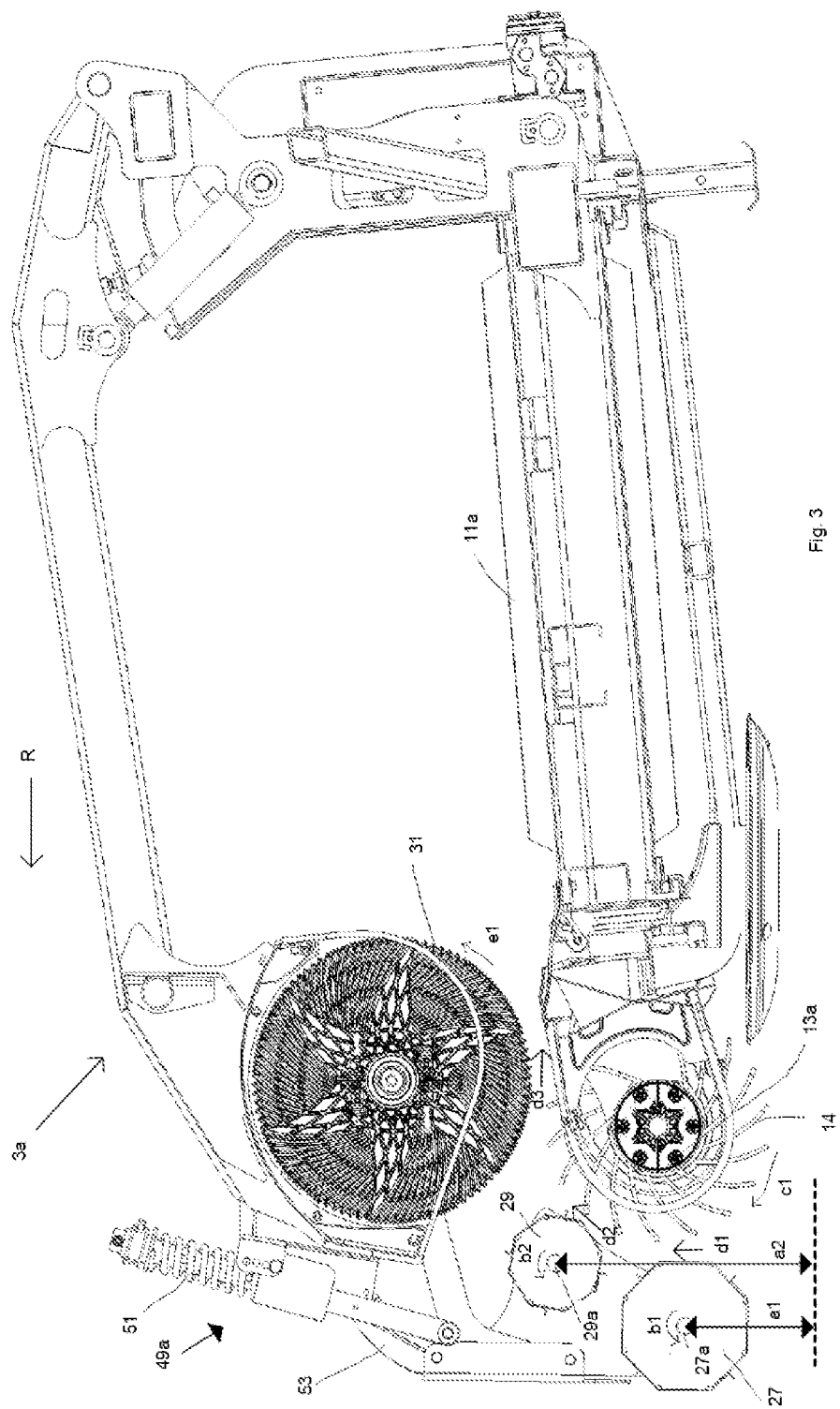

US 12,310,290 B2

MOVEABLE DEVICE FOR PICKING UP A PRODUCT FROM THE LAND

CROSS-REFERENCE TO RELATED APPLICATIONS

The present application is a U.S. National Stage Entry of International Application No. PCT/NL2020/050337 filed on May 26, 2020, which claims priority to and benefit of Netherlands Patent Application No. 2023209 filed on May 27, 2019, each of which is hereby incorporated by reference in its entirety.

The invention relates to a device which is movable in a direction of travel over land which can be worked by means of the device, wherein the device is provided with a lifting mechanism for picking up a product from the land, as well as with a transport mechanism which is positioned with respect to the lifting mechanism in such a way that the product picked up from the land by means of the lifting mechanism can be moved onto the transport mechanism, wherein the product can be conveyed in at least one transport direction and can be deposited on the land by means of the transport mechanism.

The invention furthermore relates to a self-propelled agricultural machine, for example a self-propelled belt rake, which self-propelled agricultural machine is provided with a device described herein.

Such a self-propelled belt rake (merger) is known, for example, from EP 2 661 169 A2. The self-propelled agricultural machine disclosed in this publication comprises a device with which the land can be worked. The device comprises a lifting mechanism for picking up a product, for example hay, and a conveyor belt on which the product is placed by means of the lifting mechanism. On the conveyor belt, the product is moved transversely to the direction of travel of the belt rake and is deposited back on the land at the end of the conveyor belt. With the known device, in particular the introduction of product may, under certain circumstances, such as for example with a relatively wet product, become relatively irregular, as a result of which the uptake of product from the land by means of the device may deteriorate, which may result in a product which is deposited back on the land in an irregular manner or which may result in blockages and failures in the device, which is even more problematic.

In a first aspect, it is an object of the invention to provide an improved device. In a second aspect, it is an object of the invention to provide a device in which the product can be introduced into the device in a more even manner, even under relatively inferior circumstances, such as for example with a relatively wet product.

At least one of the objects of the invention is achieved by the device as claimed in Claim 1. The claimed device is movable in a direction of travel over land which can be worked by means of the device. The device is provided with at least one lifting mechanism for picking up a product from the land, as well as with at least one transport mechanism which is positioned with respect to the lifting mechanism in such a way that the product picked up from the land by means of the lifting mechanism can be moved onto the transport mechanism, wherein the product can be conveyed in at least one transport direction and can be deposited on the land by means of the transport mechanism. The transport direction deviates preferably at least largely substantially from the direction of travel and will extend substantially transversely to the direction of travel. The device is furthermore provided with an introduction mechanism comprising at least two rotatable rollers which are arranged substantially parallel to each other and which are provided to support the lifting mechanism in order to pick up product from the land, wherein a product passage can be provided between each roller and the lifting mechanism.

By arranging at least two rollers and by providing a product passage between the rollers and the lifting mechanism, the picked-up product can be introduced more evenly into the device by means of the rollers, because the product is directly passed through and along the lifting mechanism, during picking up, by means of the lifting mechanism and the two product passages formed by the rollers, without the risk of the product collecting somewhere and/or being able to accumulate in the device. By means of the double product passage, the product can thereafter be transferred to the transport mechanism in a more even manner by means of the lifting mechanism, as a result of which fewer accumulations of product occur in the device and the product can ultimately be deposited on the land in a more uniform distribution by means of the transport mechanism. Due to the more even introduction of product in the device, productivity of the device is higher and the quality of the product deposited by means of the device is better and/or more uniform.

In this case, the two rotatable rollers support the lifting mechanism in such a manner that the product between the introduction mechanism and the lifting mechanism is initially moved in a direction which is substantially facing away from the land. Thereafter, the product is moved to the transport mechanism by means of the lifting mechanism, in a direction opposite to the direction of travel. The rollers have been found to be particularly effective with a wet product. With prior-art devices, wet product often results in accumulations in the device and even to failures, as a result of which the operation to be performed on the land by means of the device has to be interrupted, delaying the process to be performed. The claimed device improves the introduction of wet product, that is to say provides a more even introduction thereof, as a result of which the problems of the known devices with wet product are also reduced or even removed.

In one aspect, the device is configured such that, viewed in the direction of travel, the lifting mechanism is arranged between the introduction mechanism and the transport mechanism. This configuration makes an improved and relatively effective processing of the product by means of the device possible. By means of at least one of the at least two rotatable rollers, it is possible to achieve a better pick-up of the product from the land, as a result of which the product can be picked up sooner on the front side of the lifting mechanism by means of at least one of the rollers, viewed in the direction of travel. As a result thereof, the lifting mechanism which is downstream from the introduction mechanism may be arranged at a greater distance (working height) from the land, as a result of which teeth of the lifting mechanism for picking up product do not have to be inserted so far into the product present on the land. By setting the teeth to a reduced depth, the lifting mechanism thus advantageously catches less soil, resulting in less contamination of the plants which are processed by means of the device, as a result of which the quality of the product to be deposited by means of the device is improved. A relatively low working height of the roller which, viewed in the direction of travel, is situated partially or virtually completely in front of the other roller, contributes in a particularly efficient way to the fact that the lifting mechanism downstream of the introduction mechanism can be arranged at a greater distance (working height) from the land in order to achieve the above-described advantages of catching less soil. In addition, a relatively low working height of this roller provides a particularly even introduction into the device. The expression a relatively low working height of the roller which, viewed in the direction of travel, is situated partially or virtually completely in front of the other roller is understood to mean that the distance between the land and a rotation axle of this roller is equal to or smaller than the distance between the land and the rotation axle of the rotatable lifting mechanism. The other roller which, viewed in the direction of travel, is situated between the roller at the relatively low working height and the rotatable lifting mechanism, may comprise a rotation axle which is situated at a greater distance from the land than the distance between the land and the rotation axle of the rotatable lifting mechanism. The rotation axles of the two rollers and the rotation axle of the lifting mechanism extend substantially parallel, preferably in a direction which extends substantially transversely to the direction of travel. In addition, viewed in the direction of travel, the rotation axles of the two rollers of the introduction mechanism are preferably situated in front of the maximum working diameter formed by the teeth of the rotatable lifting mechanism.

In a further aspect, the at least two rollers are rotatable in the same direction of rotation in order to support the lifting mechanism, wherein a direction of rotation of the lifting mechanism for picking up product is opposite to the direction of rotation of the rollers. As a result of these directions of rotation, the product can be introduced/picked up in a particularly efficient manner, due to the fact that the lifting mechanism and the introduction mechanism consequently cooperate in order to pick the product from the land and convey it through the product passages formed between each roller and the lifting mechanism.

Furthermore, the device may be provided with an introduction rotor which is arranged above the lifting mechanism, wherein a product passage may be provided between the introduction rotor and the lifting mechanism in the direction of the transport mechanism. Due to the introduction mechanism, the product is already introduced in the device evenly distributed, which even distribution can be optimized even further by the introduction rotor which, together with the lifting mechanism, defines a further product passage.

In one particular aspect, the at least two rollers are connected to each other by means of a connecting mechanism in such a way that rotation of at least one of the two rollers automatically results in rotation of the other roller of the two rollers. This advantageously prevents the roller which, together with the lifting mechanism, forms the second product passage, from stopping to rotate or from rotating in the wrong direction, as a result of which the product will be distributed less evenly by means of the introduction mechanism. The connecting mechanism is for example provided with a drive belt and with two profiled elements which are assigned to each roller and which are operatively connected to each other by means of the drive belt in order to rotate the two rollers. Such a connecting mechanism is relatively reliable, has a long service life, even when implemented under adverse circumstances, and only requires minimal maintenance. The connecting mechanism may furthermore be provided with a compensating element arranged between the profiled elements for, in operation, compensating for variations occurring in the tension of the drive belt. In this way, it is possible to ensure in an efficient manner that the drive belt does not run off the profiled elements, not even if the introduction mechanism encounters large amounts of product, obstacles or height differences of the land, as a result of which a part of a roller may be moved upwards, in which case such a movement may cause the tension in the drive belt to decrease, as a result of which the latter may run off the profiled elements.

In an advantageous manner, a speed of rotation of the rollers depends on the speed of travel in the direction of travel of the device which is movable over the land. The higher the speed is with which the device is moved over the land, the greater the risk of the product being introduced in the device unevenly, as a result of which a higher speed of rotation of the rollers will contribute in an advantageous manner to render the introduction even again. This may be achieved, for example, relatively easily, by setting one of the two rollers at a relatively small distance, for example smaller than the diameter of the roller, with respect to the ground, as a result of which this roller and the ground or the product will be in contact, which contact will determine the speed of rotation of the roller which depends on the speed of travel. In addition, the distance between the outer circumference of the first roller and the outer circumference of the lifting mechanism may be chosen to be relatively small, for example smaller than the diameter of the roller, as a result of which the roller will be driven by the product moving through the product passage between roller and lifting mechanism. In this way, the rollers can be rotated by means of the connecting mechanism without using dedicated drive means in an automatic and energetically favourable manner if the device is moved over the land in the direction of travel. Obviously, it is also possible to rotatably drive at least one of the two rollers with or without a connecting mechanism by means of a drive mechanism. The speed of rotation of at least one of the two rollers which is to be generated by means of the drive mechanism may then be adjustable by means of a control mechanism and/or sensors. The speed of rotation may be adjusted in a stepped or continuous manner by means of the control mechanism, for example on the basis of the speed of travel of the device over the land or by input from an operator based on circumstances observed by the operator, such as for example the condition (relatively wet or relatively dry) of the product to be processed by means of the device. The speed of rotation may also be adjusted automatically by means of sensors which detect the weather conditions, the speed of the device and/or the condition of the product.

In another aspect, the ends of the introduction mechanism are attached to the device in the longitudinal direction of the introduction mechanism by means of at least one spring-mounted suspension mechanism, in such a manner that each end is movable in at least one vertical direction by means of the spring-mounted suspension mechanism, normally movable in a vertical direction and in a horizontal direction, with the ratio between these being adjustable. In this way, the rollers can get out of the way, if required, for example move upwards, such as in case of large amounts of product on the land or obstacles, without damaging the rollers. In this way, uneven structures on the land, obstacles and/or large amounts of product on the land have virtually no effect on the productivity of the device, in particular the introduction mechanism thereof. The spring-mounted suspension mechanism may be provided with a spring-mounted element and a parallelogram suspension construction cooperating with the spring-mounted element element. Such a suspension has been found to be effective, reliable and has a relatively long service life.

In another aspect, a self-propelled agricultural machine is proposed, for example a self-propelled belt rake (merger), which self-propelled agricultural machine is provided with a device as described in this document. The above-described advantages of the device also apply to a self-propelled agricultural machine provided with the device and the use of such a self-propelled agricultural machine and these are therefore not repeated here.

It is also possible to install the device described in this document in a machine which is pulled, for example by means of a tractor.

The above-described aspects will be explained below by means of an exemplary embodiment in combination with the figures. However, the invention is not limited to the exemplary embodiment described below. Rather, a number of variants and modifications are possible which also use the inventive idea and therefore fall within the scope of protection. In particular, the possibility of combining the features/aspects which have only been mentioned in the description and/or been shown in the figures with the features of the claims, in so far as they are compatible, is mentioned.

FIG. 1 shows a perspective view of a self-propelled belt rake in the operating mode in which the devices are in the working position;

FIGS. 2a,b show perspective views of a device;

FIG. 3 shows a longitudinal section of the device;

In the figures, similar components are denoted with the same reference signs.

Figure 1:
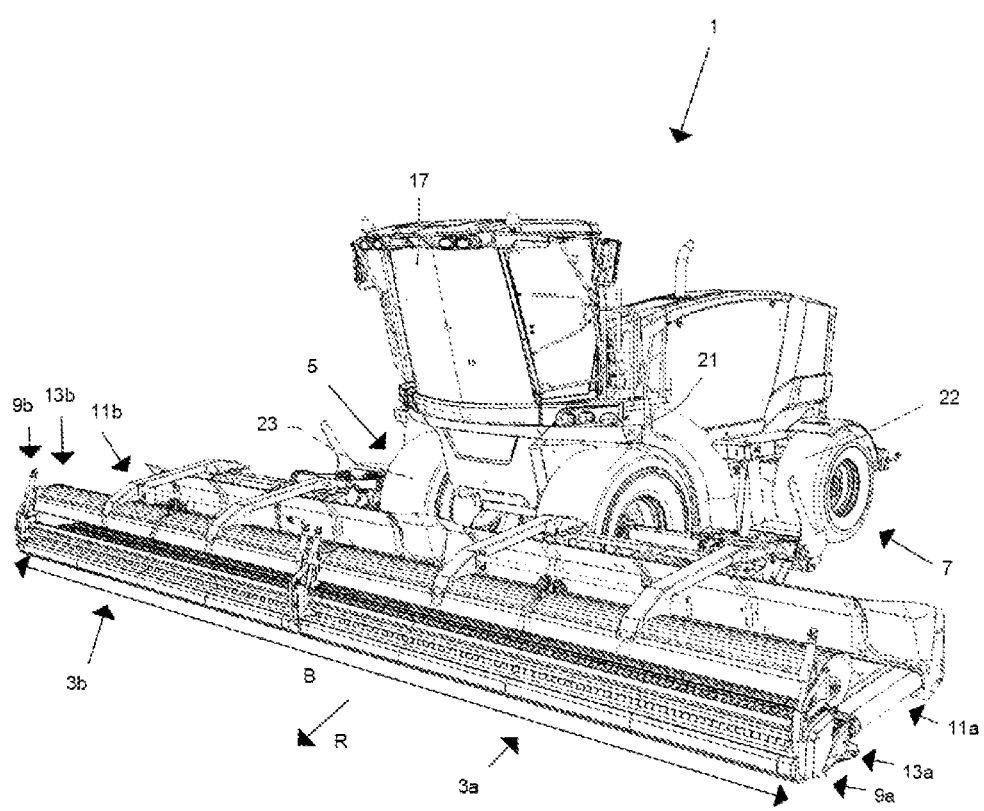

FIG. 1 shows a self-propelled agricultural machine, more particularly a self-propelled belt rake (merger) 1. Although the self-propelled agricultural machine claimed in the claims is particularly suitable for use in a self-propelled belt rake 1, the invention described in the claims may also be used in other self-propelled haymaking machines or self-propelled agricultural machines, in particular agricultural machines which can be moved over the land in the direction of travel at relatively high speeds of travel in order to perform an agricultural operation, in which the product is deposited on the land transversely/laterally with respect to the direction of travel.

The belt rake 1 is provided with two elongate devices 3a, 3b, of a first wheel axle 5 (front wheel axle), a second wheel axle 7 (rear wheel axle) situated at a distance from the first wheel axle 5 and a motor (not shown) for driving at least one of the wheel axles 5, 7.

In operation, an agricultural operation can be carried out on the land by means of the two elongate devices 3a, 3b. More particularly, each illustrated elongate device 3a, 3b is provided with an introduction mechanism 9a, 9b, a transport mechanism in the form of a conveyor belt 11a, 11b and with a product-lifting mechanism 13a, 13b for picking up a plant material product from the land, for example for picking up plant material, such as hay, grass or alfalfa or a similar product, and moving the product onto the conveyor belt 11a,11b by means of which the product can be deposited back on the land in a transport direction to the left or right of the direction of travel R of the belt rake, as is illustrated by arrow R in FIG. 1, for example in order to form a windrow. A windrow is a row of plants which is deposited on the land by harvesting machines, such as the illustrated belt rake 1, for a subsequent operation. The subsequent operation may be, for example, chopping, pressing or picking up with a loader wagon. Space is provided for the tyres/wheels 21, 22, 23 of the belt rake 1 or another harvesting machine for a subsequent harvesting operation or for carrying out a subsequent agricultural operation on the land.

In the working position of the belt rake 1 illustrated in FIG. 1, the conveyor belts 11a, 11b of the two elongate devices 3a, 3b are positioned with respect to each other in such a way that the conveyor belts 11a, 11b may be formed as a single part for depositing the product to the left or right of the belt rake 1 with respect to the direction of travel R. Optionally, the conveyor belts 11a, 11b may deposit the product to the left and right of the belt rake 1 with respect to the direction of travel R. In the situation illustrated in FIG. 1, the product, for example grass, is picked up across virtually the entire width B by means of the introduction mechanisms 9a, 9b and the product-lifting mechanisms 13a, 13b and deposited back on the land in rows via the conveyor belts 11a, 11b. In the working position, the two elongate devices 3a, 3b are situated in front of the front wheel axle 5, so that the wheels of the belt rake cannot travel over the product to be picked up, since the product in front of the machine is picked up by the devices 3a, 3b and deposited in such a manner that the wheels of the belt rake 1 normally cannot come into contact with the grass deposited in rows by the devices 3a, 3b. The width B is at least 1.5 times the width between the outer sides of the front wheels 21, 23 or rear wheels 22 of the belt rake 1.

In the belt rake 1, each elongate device 3a, 3b is movable from a transport position (not shown) to a working position, as is shown in FIG. 1, and vice versa. In the transport position of the devices 3a, 3b, the maximum width of the belt rake 1 is smaller than the width B (FIG. 1) in the working position of the devices 3a, 3b. The belt rake 1 has a fold-in and fold-out mechanism for moving the elongate devices 3a, 3b between the working position and the transport position. Due to the elongate devices 3a, 3b, the belt rake 1 is at least 1.5 wider in the working position than in the transport position. The length of an elongate device 3a, 3b is 2.5-7.5 metres, normally approximately 5 metres. The fold-in and fold-out mechanism operates hydraulically. In the working position (FIG. 1), each elongate device 3a, 3b encloses an angle of 90 degrees with the direction of travel R of the belt rake 1, preferably this angle is between 80-100 degrees. In the transport position, each elongate device 3a, 3b encloses an angle of 0 degrees with the direction of travel R. This angle may vary between 0-15 degrees, preferably between 0-5 degrees. With the belt rake 1, the angle, viewed from a top view (not shown), between the working position and the transport position of each device 3a, 3b is approximately 90 degrees. In other words, by means of the fold-in and fold-out mechanism, the at least two elongate devices 3a, 3b are situated in front of the front wheel axle 5 in the working position, with the at least two elongate devices being situated largely or completely behind the front wheel axle 5 in the transport position.

The two elongate devices 3a, 3b are virtually identical and are attached to the chassis of the belt rake 1 in mirror image by means of the fold-in and fold-out mechanism.

The belt rake 1 furthermore comprises a cabin 17 which is positioned such that it is situated above the first wheel axle 5 between the working position and the transport position of the elongate devices. In this way, the driver has an optimum view, both in the transport operating mode of the belt rake 1 and in the working position mode (FIG. 1) of the belt rake 1.

In the working position of the devices 3a, 3b, the agricultural operation on the land may be carried out along substantially the length of each elongate device. In the working position, this length extends in the width direction B. In the working position illustrated in FIG. 1, the lengths of the devices 3a, 3b added together correspond to the width B. The two elongate devices 3a, 3b are each provided with a displacement unit with which, in the working position, the distance between the at least two elongate devices 3a, 3b, viewed in the longitudinal direction, illustrated in FIG. 1 by width B, of the two elongate devices can be adjusted. It is also possible to provide only one of the devices 3a, 3b with a displacement unit for moving the one device 3a to the left or right of the direction of travel R with respect to the other device 3b in the working position. By providing space between the devices 3a, 3b in the working position, it is also possible to deposit product in between (central deposition).

Figure 2A:
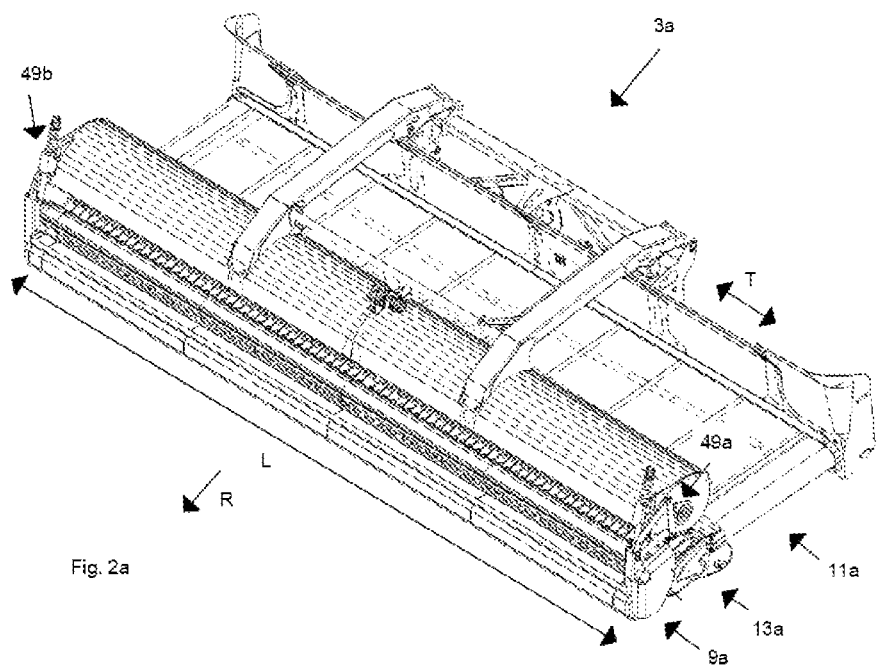

The identical devices 3a, 3b will be explained in more detail with reference to the FIGS. 2a,b-4.

The device 3a, 3b is provided with at least one lifting mechanism 13a for picking up a product from the land, as well as with at least one transport mechanism 11a which is positioned in such a way with respect to the lifting mechanism 13a that the product which was picked up from the land by means of the lifting mechanism 13a can be moved onto the transport mechanism 11a. By means of the transport mechanism 11a, the product can be conveyed in at least one transport direction T (to the left or right of the direction of travel R) and can be deposited on the land. The device 3a, 3b is furthermore provided with an introduction mechanism 9a,9b comprising at least two (FIGS. 3 and 4), substantially parallel and rotatable rollers 27, 29 which are provided to support the lifting mechanism 13a in order to pick up product from the land, in which a product-passage illustrated by arrows d1, d2 may be provided between each roller 27, 29 and the lifting mechanism 13a. Viewed in the direction of travel R, the lifting mechanism 13a is arranged between the introduction mechanism 9a and the transport mechanism 11a. The distance between the outer circumference of the rollers 27, 29 and the outer circumference of the lifting mechanism which provide the product passages d1, d2 is relatively small, that is to say smaller than the diameter of each roller 27, 29 or even smaller than the radius of each roller 27, 29.

The rollers 27, 29 are arranged in the introduction mechanism 9a in such a way that the distance a1 (FIG. 3) between the land (represented in FIG. 3 by a dashed line) and a rotation axle 27a of a first roller 27 of the at least two rotatable rollers 27, 29 is smaller than the distance a2 between the land and a rotation axle 29a of a second roller 29 of the at least two rotatable rollers 27, 29. The two rollers 27, 29 have a different diameter, with the roller 27, viewed in the direction of travel, which is situated partially in front of the other roller 29 having the largest diameter. The distance between the rollers 27, 29 arranged one above the other is smaller than the smallest diameter, that is to say the diameter of the roller 29. The diameters of the rollers 27, 29 may also be equal, but in a preferred variant, the roller 27 which, viewed in direction of travel, is situated partially in front of the other roller 29 has the largest diameter, which enables a particularly even introduction of the product, even in case of a relatively wet product. The two rollers 27, 29 are rotatable in the same direction of rotation b1, b2 to support the lifting mechanism 13a, with a direction of rotation c1 of the lifting mechanism 13a for picking up product being opposite to the direction of rotation b1, b2 of the rollers 27, 29. The speed of rotation of the rollers 27, 29 and/or of the lifting mechanism 13a depends on the speed of travel in the direction of travel R of the device 3a which is movable over the land. This can be achieved by selecting the distance between the ground and the roller 27 to be relatively small, smaller than the diameter of the roller 27, and/or by setting the distance of the rollers 27, 29 to the lifting mechanism 13a to be relatively small, as mentioned above. In addition, it is possible to drive the two rollers by means of a drive mechanism (not shown), for example a hydraulic motor, in such a way that the speed of rotation depends on the speed of travel across the land.

The device 3a is furthermore provided with an introduction rotor 31 which, in operation, is rotatable in the direction denoted by arrow e1, wherein the introduction rotor 31 is arranged above the lifting mechanism 13a, wherein a product passage, denoted by arrow d3, can be provided between the introduction rotor 31 and the lifting mechanism 13a, in the direction of the transport mechanism 11a. The term above is understood to mean that the introduction rotor 31 is situated higher, viewed in a vertical direction, in such a way that there is space for the product passage, denoted by arrow d3, between the maximum working diameter of the introduction rotor 31 and the maximum working diameter of the rotatable lifting mechanism 13a, 13b (formed by the teeth of the rotatable lifting mechanism). In the illustrated variant, viewed in the (horizontal) direction of travel R, the rotation axle of the introduction rotor 31 is situated between the rotation axle of the rotatable lifting mechanism 13a, 13b and the transport mechanism 11a, wherein, viewed in the (horizontal) direction of travel R, the distance between the rotation axle of the introduction rotor 31 and the rotation axle of the rotatable lifting mechanism 13a, 13b is minimal, that is to say is smaller than the radius of the maximum working diameter of the rotatable lifting mechanism 13a, 13b (formed by the teeth of the rotatable lifting mechanism). The radius (or the maximum working diameter) of the rotatable lifting mechanism 13a,13b is smaller than the radius (or the maximum working diameter) of the introduction rotor 31.

The two rollers 27, 29 are connected to each other in such a way by means of a connecting mechanism 35 (FIG. 4) that rotating at least one of the two rollers 27 automatically results in rotation of the other roller 29 of the two rollers 27, 29. The connecting mechanism 35 is provided with a drive belt 37, more particularly a V-belt, as well as with two profiled elements (pulleys) 39, 41 which are assigned to each roller 27, 29 and which are operatively connected to each other by means of the drive belt 37 in order to rotate the two rollers 27, 29. The diameter of the pulleys can be varied in order to set or provide the desired speed of rotation for each roller 27, 29. The connecting mechanism 35 is furthermore provided with a compensating element (tension pulley) 43 arranged between the profiled elements in order to, in operation, compensate for variations occurring in the tension of the drive belt 37. By connecting the rollers 27, 29 to each other by means of the connecting mechanism 35, it is ensured that the rollers 27, 29 continue to rotate during operation in order to provide the passages d1, d2. In addition, this also ensures that both rollers 27, 29 continue to rotate in the same direction b1,b2. It is also possible to provide a drive mechanism (not shown), for example a hydraulic motor, for only one of the two rollers, in which case both rollers 27, 29 can be rotated in the direction of rotation b1, b2 by only a single drive mechanism by means of the connecting mechanism. By means of these rollers 27, 29, an even passage of plants along the lifting mechanism 13a is achieved, even with a relatively wet product. Due to the contact with the ground or the product, the front roller 27 will always rotate, with the connecting mechanism 35 ensuring that the other roller 29 will also continue to rotate in the desired manner in order to support the lifting mechanism 13a. In addition, the teeth 14 of the lifting mechanism 13a may be set to a reduced depth (further from the ground). By setting the teeth 14 to a reduced depth, the lifting mechanism 13a thus advantageously catches less soil, resulting in less contamination of the product which is processed by means of the device 3a, as a result of which the quality of the product to be deposited by means of the device 3a is improved.

Figure 2B:
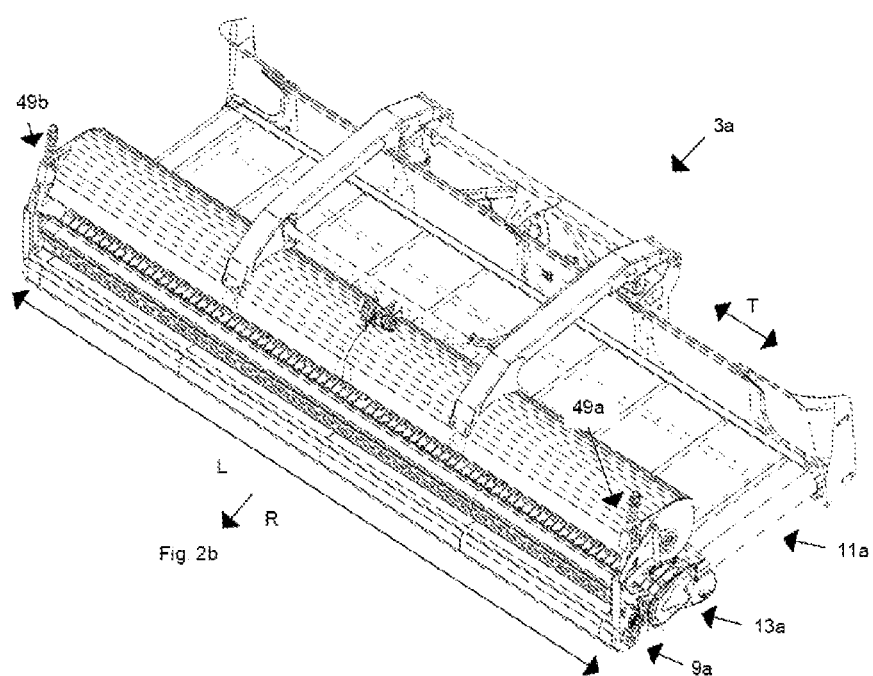

The working length L (FIGS. 2a, 2b) of two rollers 27, 29 substantially corresponds to the working length L of the transport mechanism 11a. 12 which extends transversely to the direction of travel R. The working length L is 2.5-7.5 metres, normally approximately 5 metres.

At its ends, the introduction mechanism 9a is attached to the device 3a in the longitudinal direction (L) of the introduction mechanism 9a by means of a spring-mounted suspension mechanism 49a, 49b, in such a way that each end is at least movable in a vertical direction by means of the spring-mounted suspension mechanism. The spring-mounted suspension mechanism 49a, 49b is provided with a spring-mounted element 51 and a parallelogram suspension construction 53 cooperating with the spring-mounted element 51. The parallelogram suspension construction 53 is an irregular parallelogram. The rollers 27, 29 may be moved, for example, upwards by means of this suspension mechanism 49a, 49b, for example if there is a large amount of product (grass) on the land or in case of (significant) uneven structures on the land. If such an amount of product or the uneven structure is only present on one side of the device 3a, the rollers 27, 29 will move up by means of the suspension mechanism 49a or the suspension mechanism 49b on one side. If this happens, the heart-to-heart distance of the profiled elements 39, 41 changes, as a result of which the tension in the drive belt also varies, which can then be compensated particularly effectively by means of the tensioning pulley 43, so that this has no further (adverse) effects.

Figure 4:
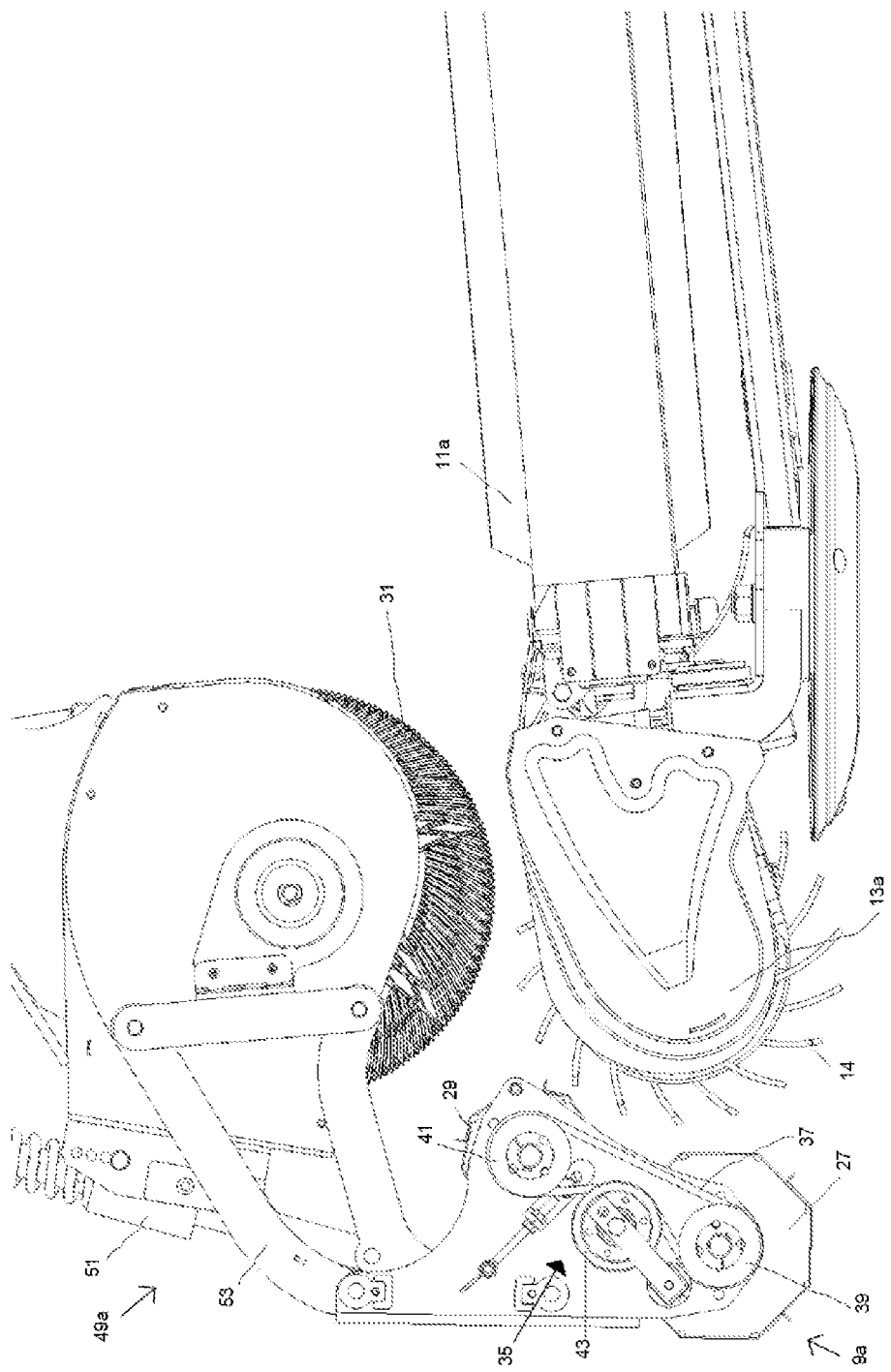
FIG. 4 shows a side view of the device.

In a variant (not shown), the introduction rotor (denoted by reference numerals 31 in FIGS. 3 and 4) is situated more in the direction of the conveyor belts (11a,b), that is to say, viewed in the (horizontal) direction of travel R, the rotation axle of the introduction rotor is situated approximately midway along the distance between the rotation axle of the rotatable lifting mechanism (13a, 13b) and the conveyor belts of the transport mechanism, wherein, viewed in the (horizontal) direction of travel R, this distance is greater than shown in FIGS. 3 and 4, that is to say approximately equal or even greater than the radius of the maximum working diameter of the rotatable lifting mechanism (formed by the teeth of the rotatable lifting mechanism). In addition, in this variant (not shown), the radius (or the maximum working diameter) of the rotatable lifting mechanism is smaller than the radius (or the maximum working diameter) of the introduction rotor. In this configuration of the variant (not shown), the position of the rollers 27, 29, illustrated in FIGS. 3 and 4, with respect to the lifting mechanism 13a may be identical or virtually identical to the position as shown in FIGS. 3 and 4. The space which is created in the variant (not shown) by positioning the introduction rotor more in the direction of the transport mechanism compared to the configuration shown in FIGS. 3 and 4, may be used to position a further (third) roller (not shown) above the lifting mechanism, wherein, viewed in the (horizontal) direction of travel R, the rotation axle of the further roller is situated between the rotation axle of the rotatable lifting mechanism (13a, 13b) and the rotation axle of the roller, denoted by reference numeral 29 in FIGS. 3 and 4, more particularly, viewed in the (horizontal) direction of travel R, the distance between the rotation axle of the further roller and the rotation axle of the lifting mechanism is minimal, that is to say smaller than the radius of the maximum working diameter of the rotatable lifting mechanism (formed by the teeth of the rotatable lifting mechanism). The diameter of the maximum working diameter of the further roller (not shown) is equal to or smaller than the maximum working diameter of the roller 29, as is shown in FIGS. 3 and 4.

Figure 5:
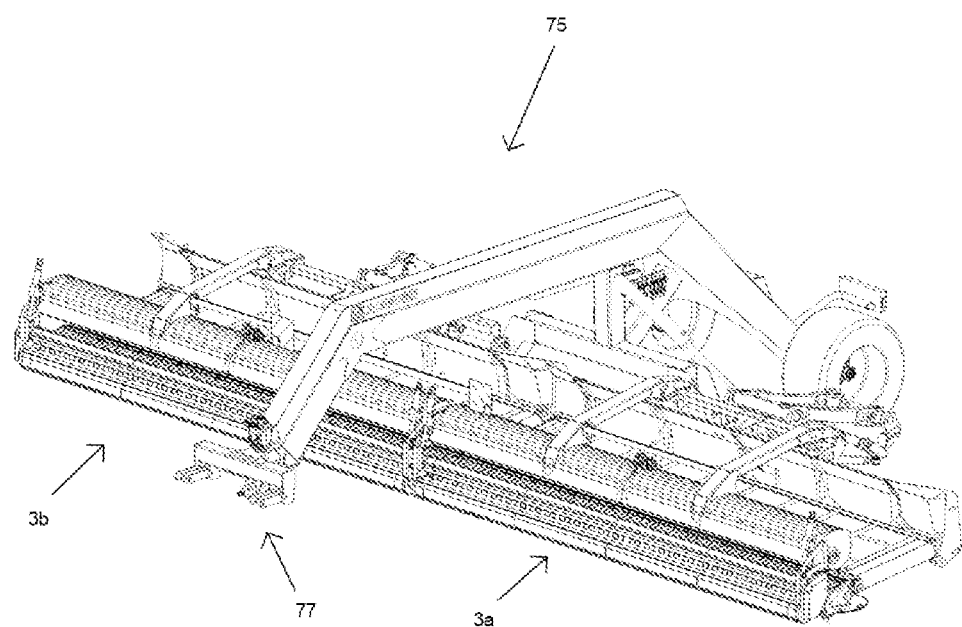
FIG. 5 shows a perspective view of a pulled machine.

Finally, FIG. 5 shows a pulled machine 75 which can be connected to a vehicle, for example a tractor, by means of a coupling 77. The pulled machine 75 contains the two devices 3a, 3b which have already been discussed above.

The invention claimed is:

1. A device which is movable in a direction of travel over land which can be worked by means of the device, wherein the device is provided with at least one lifting mechanism for picking up a product from the land, as well as with at least one transport mechanism which is positioned with respect to the lifting mechanism in such a way that the product picked up from the land by the lifting mechanism can be moved onto the transport mechanism, wherein the product can be conveyed in at least one transport direction and can be deposited on the land by the transport mechanism, characterized in that the device is furthermore provided with an introduction mechanism comprising at least two rotatable rollers which are arranged substantially parallel to each other and which are provided to support the lifting mechanism in order to pick up product from the land, wherein a product passage is provided between each roller and the lifting mechanism, wherein, viewed in the direction of travel, the lifting mechanism is arranged between the introduction mechanism and the transport mechanism, wherein the distance between the land and a rotation axle of a first roller of the at least two rotatable rollers is smaller than the distance between the land and a rotation axle of a second roller of the at least two rotatable rollers, wherein the distance between the land and the rotation axle of the first roller is smaller than the distance between the land and a rotation axle of the lifting mechanism, wherein the at least two rollers are connected to each other by a connecting mechanism and wherein rotation of the first roller of the at least two rollers automatically results in rotation of the second roller of the at least two rollers, the first roller is driven when contacting the ground in operation that results in the second roller being automatically driven via the connecting mechanism.

2. The device according to claim 1, wherein the at least two rollers are rotatable in the same direction of rotation in order to support the lifting mechanism, wherein a direction of rotation of the lifting mechanism for picking up product is opposite to the direction of rotation of the rollers.

3. The device according to claim 1, wherein the device is furthermore provided with an introduction rotor which is arranged above the lifting mechanism, wherein a product passage is provided between the introduction rotor and the lifting mechanism in the direction of the transport mechanism.

4. The device according to claim 1, wherein the connecting mechanism is provided with a drive belt and with two profiled elements which are assigned to each roller and which are operatively connected to each other by the drive belt to rotate the two rollers.

5. The device according to claim 4, wherein the connecting mechanism is furthermore provided with a compensating element arranged between the profiled elements for, in operation, compensating for variations occurring in the tension of the drive belt.

6. The device according to claim 1, wherein the working length of two rollers substantially corresponds to the working length of the transport mechanism which extends transversely to the direction of travel.

7. The device according to claim 1, wherein a speed of rotation of the rollers depends on a speed of travel in the direction of travel of the device which is movable over the land.

8. The device according to claim 1, wherein the ends of the introduction mechanism are attached to the device in the longitudinal direction of the introduction mechanism by at least one spring-mounted suspension mechanism, in such a manner that each end is at least movable in a vertical direction by means of the spring-mounted suspension mechanism.

9. The device according to claim 8, wherein the at least one spring-mounted suspension mechanism is provided with a spring-mounted element and a parallelogram suspension construction cooperating with the spring-mounted element.

10. A self-propelled agricultural machine being provided with at least one device according to claim 1.

11. The self-propelled agricultural machine according to claim 10, wherein the device is provided with a motor, a front wheel axle and a rear wheel axle which is situated at a distance from the front wheel axle, wherein the front wheel axle and/or the rear wheel axle can be driven by the motor to move the agricultural machine, wherein the device is movable from a transport position to a working position and vice versa by a fold-in and fold-out mechanism, so that the maximum width of the self-propelled agricultural machine is smaller in the transport position of the device than in the working position of the device.

12. The self-propelled agricultural machine according to claim 10, wherein, in a working position, the operation to be carried by the device, may be carried out substantially along the length of the elongate device.

13. The self-propelled agricultural machine according to claim 10, wherein the agricultural machine is provided with two devices according to claim 1 which, in a transport position, are positioned on either side of the agricultural machine in such a manner that the longitudinal direction of the devices extend substantially parallel to the direction of travel of the agricultural machine, wherein, in a working position, the longitudinal direction of the devices extends substantially transversely to the direction of travel, wherein the at least one device, in the working position, is situated in front of the front wheel axle, wherein, in a transport position, the at least one device is largely or completely situated behind the front wheel axle.

14. The self-propelled agricultural machine according to claim 11, wherein the at least one device, in the working position, encloses an angle of 80-100 degrees with the direction of travel of the agricultural machine, wherein the at least one device, in the transport position, encloses an angle of 0-15 degrees with the direction of travel of the agricultural machine.

15. The self-propelled agricultural machine according to claim 13, wherein at least one of the two elongate devices is provided with a displacement unit with which, in the working position, the distance between the at least two elongate devices, viewed in the longitudinal direction of the at least two elongate devices, can is adjusted.

16. A pulled agricultural machine which is provided with at least one device according to claim 1.

* * * * *